(12) United States Patent
Michioka et al.

(10) Patent No.: US 6,715,207 B2
(45) Date of Patent: Apr. 6, 2004

(54) METHOD OF MANUFACTURING SLIDING BEARINGS

(75) Inventors: Hidekazu Michioka, Tokyo (JP); Tomozumi Murata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/075,305

(22) Filed: Feb. 15, 2002

(65) Prior Publication Data

US 2002/0112351 A1 Aug. 22, 2002

(30) Foreign Application Priority Data

Feb. 16, 2001 (JP) ........................................ 2001-040424

(51) Int. Cl.[7] .............................................. B21D 53/10
(52) U.S. Cl. ............................ 29/898.047; 29/898.042; 29/898.043; 29/898.049; 29/898.059; 29/898.12; 29/527.5
(58) Field of Search ........................ 29/527.5, 898.041, 29/898.042, 898.058, 898.059, 898.07, 898.11, 898.12, 898.047, 898.043, 898.049; 384/37, 276, 280

(56) References Cited

U.S. PATENT DOCUMENTS

| | | | | |
|---|---|---|---|---|
| 1,494,099 A | * | 5/1924 | Cole |
| 2,048,247 A | * | 7/1936 | Davis |
| 2,252,351 A | * | 8/1941 | Paulus |
| 2,901,300 A | * | 8/1959 | Burr |
| 3,101,961 A | * | 8/1963 | White |
| 3,193,910 A | * | 7/1965 | Evans |
| 3,363,300 A | * | 1/1968 | Stec, Sr. |
| 4,979,844 A | | 12/1990 | Teramachi |
| 5,653,547 A | | 8/1997 | Teramachi et al. |
| 5,980,112 A | * | 11/1999 | Matthews |
| 6,139,788 A | * | 10/2000 | Dorr |

FOREIGN PATENT DOCUMENTS

| FR | 2141660 | * | 1/1973 |
| JP | 51-42569 | | 11/1976 |
| JP | 64-012118 | * | 1/1989 |
| JP | 2002-39159 | | 2/2002 |

OTHER PUBLICATIONS

"Composites" Matco Associates, Inc. http://matcoinc.com/composites.php.*

* cited by examiner

Primary Examiner—David P. Bryant
Assistant Examiner—Eric Compton
(74) Attorney, Agent, or Firm—Rader, Fishman & Grauer PLLC

(57) ABSTRACT

A method of manufacturing sliding bearings of the type in which a sliding guide surface is formed by using a resin liner, including fixing a thermosetting resin, which constitutes the resin liner, on the whole or a part of a sliding guide surface of a first member by an injection molding operation using the first member as a core, thereafter molding a second member, which covers a sliding guide surface of the first member, by a metal molding operation with the resin liner-fixed first member placed firmly as a core in a metal mold, and thermally curing the resin liner with the heat working on the sliding surface of the first member during the molding of this second member.

7 Claims, 6 Drawing Sheets

METHOD OF MANUFACTURING SLIDING BEARINGS

BACKGROUND OF THE INVENTION

Field of the Invention

This invention relates to a method of manufacturing a sliding bearing in which a first member and a second member are combined together relatively movably, such as, for example, a spherical bearing in which a ball portion and a holder are connected together rotatably or swingably, and a linear guide appratus in which a track shaft and a slider are combined together slidably, and more particularly to a method of manufacturing a sliding bearing of the type in which a resin liner is interposed between such first and second members.

Japanese Patent Publication No. 42569/1976 discloses a spherical bearing in which an inner race and an outer race are combined together rotatably or swingably via a resin liner. To be concrete, this spherical bearing includes an inner race provided with a convex surface as a sliding guide surface, a resin liner of a low friction coefficient covering the convex surface of this inner race, and an outer race covering the convex surface of the inner race via this resin liner. Since the resin liner and inner race fixed to each other are in sliding contact with the outer race, these inner and outer races are combined together rotatably or swingably.

In this spherical bearing, the outer race is molded by die casting with the inner race used as a core, the inner race being thereby sealed in an inner portion of the outer race. Namely, a resin liner formed cylindrically in advance is put on the convex surface of an inner race member, and the resultant product is thereafter set as a core in a metal mold, a pressurized molten metal, such as a zinc alloy, an aluminum alloy and the like being poured with the core left in this condition into a cavity of the metal mold to cast an outer race. As a result, an outer race holding an inner race therein is cast, and such an inner race is put in an inseparably sealed condition with respect to an inner portion of the outer race. The resin liner put on the inner race contacts the convex surface thereof closely owing to a casting pressure, and a clearance between the inner race and resin liner is thereby eliminated. On the other hand, the resin liner is put in a fused state with respect to the outer race, and the inner race alone becomes capable of contacting the resin liner slidably without any clearance therebetween. Thus, the rotating or swinging movement of the inner race with respect to the outer race in the spherical bearing disclosed in the same publication can be made practically without rattle.

In order to produce such spherical bearings in large quantities and reduce the manufacturing cost, it can be said that molding a cylindrical resin liner directly on a spherical surface of an inner race by injection molding with an inner race used as a core, and not putting a cylindrically molded resin liner on a convex surface of an inner race is preferable. Namely, in a preferable procedure for manufacturing a spherical bearing, a resin liner is put on the convex surface of an inner race directly first by injection molding with an inner race used as a core, and this resin liner-carrying inner race is thereafter placed as a core in a metal mold to cast an outer race as mentioned above. According to such a method, the resin liner comes into close contact with the convex surface of the inner race in a stage of completion of the molding thereof, so that the eliminating of a clearance between the resin liner and inner race can be done more easily.

When the above-mentioned inner race makes swinging movements repeatedly at a high speed with respect to the outer race, it is predicted that the temperature of the resin liner becomes high due to the friction between the resin liner and inner race. Therefore, it can be said that such a resin liner be formed preferably by using a thermosetting resin for the purpose of preventing the resin liner from being softened when the temperature is high.

However, when a resin liner is injection molded by using a thermosetting resin, it is necessary to maintain the resin liner, which has just been injection molded, at a temperature not lower than a predetermined level for a predetermined period of time, and thereby promote the turning of the thermosetting resin into a three-dimensional macromolecular compound. For example, in order to injection mold a resin liner of around 0.8 mm in thickness out of a phenol resin, it is necessary that an inner race and resin liner be retained in a metal mold maintained at 170 to 200° C. for around 10 to 20 seconds even after the injection molding is completed. Otherwise, it is impossible to completely polymerize and cure the phenol resin which turns into a resin liner. In short, when a thermosetting resin is used as a material for a resin liner, excessive manufacturing time corresponding to the retention time is necessarily spent due to a polymerization reaction, and this greatly hampers the improvement of the production efficiency and the reduction of the production cost.

Such problems are not peculiar to a spherical bearing but applicable to all sliding bearings of the type in which a resin liner is used to form the whole or a part of a sliding guide surface.

SUMMARY OF THE INVENTION

The present invention has been made in view of such problems, and provides a manufacturing method of a sliding bearing of the type in which a sliding guide surface is formed by using a resin liner, capable of being produced with a high efficiency without wasting time even when the resin liner is manufactured by injection molding a thermosetting resin, and capable in its turn of reducing the production cost.

Namely, the present invention is characterized in that it provides a method of manufacturing a sliding bearing having a first member provided with a sliding guide surface, a second member which is provided with a sliding guide surface slidingly contacting the sliding guide surface of the first member, and which can be moved relatively to the first member, and a resin liner provided on at least a part of the sliding guide surface of the second member and slidingly contacting the sliding guide surface of the first member, including a first step of forming a sliding guide surface on the first member, a second step of fixing a thermosetting resin, which is to form the resin liner by injection molding using a metal mold in which the first member is inserted as a core, on the whole region or a part of the sliding guide surface of the first member, and covering the sliding guide surface of the first member with the same resin by molding using a metal mold, a third step of thermally curing the resin liner with the heat working on the sliding guide surface of the first member, when molding the second member, and a fourth step of forming a very narrow clearance between the sliding guide surfaces of the first member and second member by applying an external force to the first member or the second member, and thereby enabling a relative movement of the second member with respect to the first member to be made.

According to the method constituted in this manner of the present invention, the thermosetting resin which is to form the resin liner is not subjected to an independent thermal curing process immediately after the completion of the injection molding thereof but subjected to a thermal curing process by utilizing the molding heat during the molding of the second member in a metal mold. Therefore, the resin liner molding operation in the metal mold and the thermal curing process for the resin liner progress at the same time in the same time zone. This enables the production time to be shortened as compared with a method in which the thermal curing time for the resin liner is provided between the step of injection molding the resin liner and that of molding the second member in the metal mold.

DESCRIPTION OF THE PREFERRED EMBODIMENTS

The method of manufacturing sliding bearings according to the present invention will now be described on the basis of what are shown in the attached drawings.

First Embodiment

Figure 1:
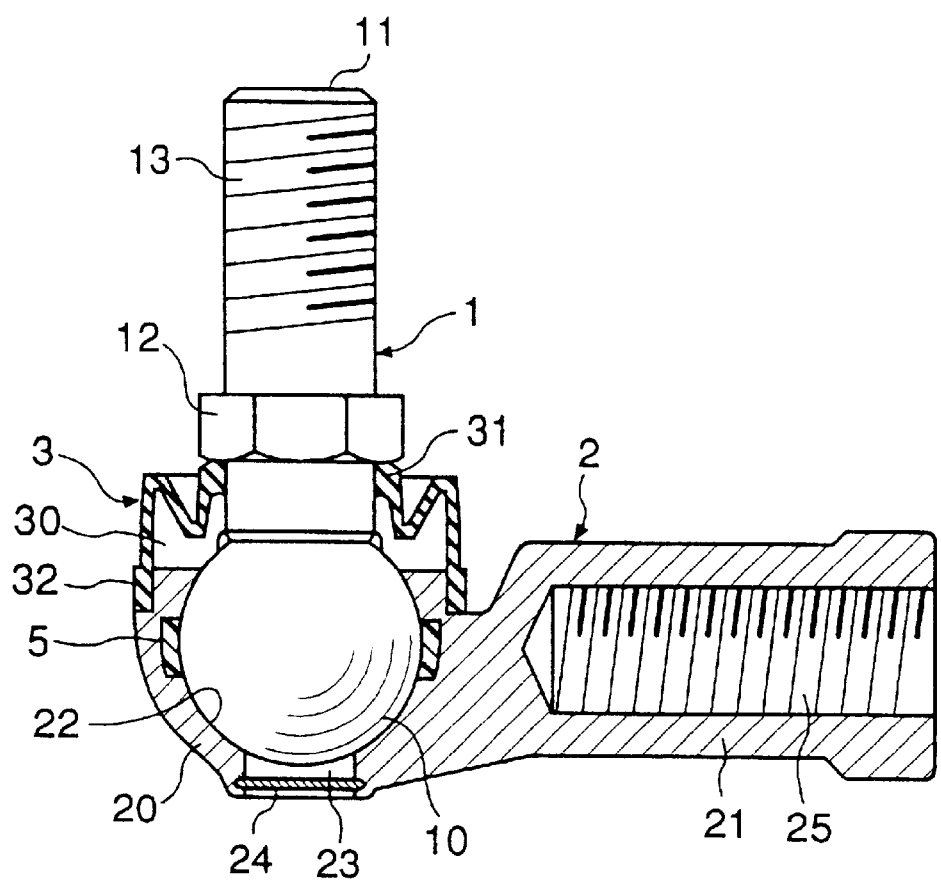
FIG. 1 is a sectional view showing a first embodiment in which the method according to the present invention is applied to a spherical bearing.
Figure 2:
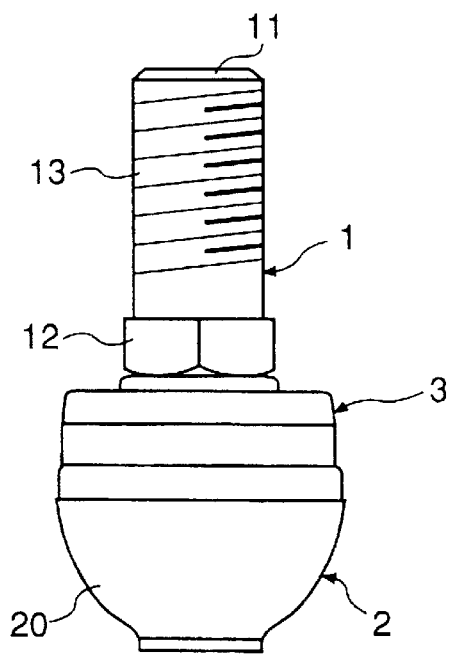
FIG. 2 is a side view showing the spherical bearing in the first embodiment.

FIG. 1 and FIG. 2 show a spherical bearing manufactured by utilizing the method according to the present invention. This spherical bearing includes a ball shank 1 as a first member provided with a ball portion at an end section thereof, and a holder 2 as a second member having a ball receiving portion 20 for holding the ball portion 10 of this ball shank 1. A convex surface of the ball portion and a concave surface of the ball receiving portion slidingly contact each other, and the ball shank 1 and holder 12 are thereby connected together swingably or rotatably.

The ball shank 1 is formed by welding a rod type shank 11 to a steel ball of a high sphericity which is to form the ball portion 10, and a hexagonal seat 12 for fixing a mount, such as a link and the like thereto is formed at a root portion of this shank 11. A male thread 13 is formed on a free end portion of the shank 11, and the mount can be held fixedly between a nut and the hexagonal seat 12 by engaging the nut with this male thread 13.

The holder 2 is provided with the ball receiving portion 20 for holding the ball portion 10 of the ball shank 1, and a fixing portion 21 for combining such a ball receiving portion 20 with a link, and these ball receiving portion 20 and fixing portion 21 are molded in one body by die casting an aluminum alloy or a zinc alloy. The ball receiving portion 20 covers substantially ⅔ of the surface of the ball portion 10 of the ball shank 1 so that the ball portion 10 does not come off, and a concave slide contact surface 22 substantially in conformity with the spherical surface of the ball portion 10 is formed on the inner side of this ball receiving portion 20. Owing to this arrangement, the ball shank 1 can freely make with respect to the holder 2 a swinging movement around the ball portion 10 as the center thereof or a rotating movement. The holder 2 is provided with an oil reservoir 23 in the portion thereof which is on the opposite side of the shank 11, and such an oil reservoir 23 is closed with a cover member 24. The fixing portion 21 is provided with a female thread 25 so that, for example, a male thread formed on a free end portion of a rod and the like constituting a link can be engaged therewith.

Between an outer circumferential edge of the holder 2 and the shank 11 of the ball shank 1, a boot seal 3 is provided, which prevents the entry of dust and waste into a clearance between the ball portion 10 of the ball shank 1 and the ball receiving portion 20 of the holder 2, and forms a seal pocket 30 for holding a lubricant, such as grease and the like therein. An end portion 31, which is on the side of the ball shank 1, of the boot seal 3 adheres to the shank 11 owing to the elasticity thereof, while an end portion 32 thereof which is on the side of the holder 2 is held on an outer circumferential edge of the holder 2 by a locking ring so that the boot seal does not come off even by a swinging or rotating movement of the ball shank 1.

As mentioned above, the ball receiving portion 20 of the holder 2 is molded by casting an aluminum alloy or a zinc alloy, and the slide contact surface 22 contacting the ball portion 10 of the ball shank 1 is also made of such an alloy. Between the slide contact surface 22 of the ball receiving portion and the spherical surface of the ball portion 10, a very narrow clearance (for example, not larger than 0.1 mm in width) is formed, and a lubricant flows from the seal pockets provided on both sides of the ball receiving portion 20 into this clearance so as to form an oil film between the spherical surface of the ball portion 10 and the slide contact surface 22 of the ball receiving portion 20. This enables in this spherical bearing the ball portion 10 made of a steel ball and the ball receiving portion 20 also made of a metal to slidingly contact each other in an oil film-lubricated state, and the ball shank 1 to make a light and smooth movement with respect to the holder 2.

Although the slide contact surface 22 of the ball receiving portion 20 and the spherical surface of the ball portion 10 contact each other substantially uniformly, it is conceivable that a high load be imparted to a local portion of the slide contact surface 22 in a certain mode of use of the spherical bearing. A ring type resin liner 5 is provided on a part of such a slide contact surface 22 on the assumption that contact surface pressures of these slide contact surface 22 and ball portion 10 become high to cause the oil film to be broken. Since it is necessary to prevent the resin liner from being softened due to the frictional heat occurring between the ball portion and ball receiving portion, this resin liner 5 is formed, for example, of a thermosetting resin, such as a phenol resin and the like, and provided on a local portion of the slide contact surface 22 on which the breakage of the oil film is thought to occur easily. Therefore, even when an accident, such as the breakage of the oil film between the ball portion 10 and slide contact surface 22 occurs on a portion on which a high load works locally, such a direct contact of the spherical surface of the ball portion 10 and the slide contact surface 22 of the ball receiving portion 20 with each other that causes damage to these surfaces can be prevented, and a worst case where the seizure of the ball portion 10 and ball receiving portion 20 occurs can also be avoided.

Therefore, in view of the function of the resin liner 5 to be fulfilled at the time of occurrence of such breakage of the oil film, it is preferable that a material out of which such a resin liner 5 is molded be a material having a high abrasion resistance, and a self-lubricating ability so as not to prevent a movement of the ball shank 1 even when solid contact occurs between the resin liner and ball portion 10. A position in which the resin liner 5 is buried with respect to the ball receiving portion 20 is not limited to that in this embodiment. The resin liner may be provided in an optimum position in accordance with the distribution of the contact surface pressure between the ball portion 10 and slide contact surface 22.

A concrete method of manufacturing this spherical bearing will now be described.

Figure 3:
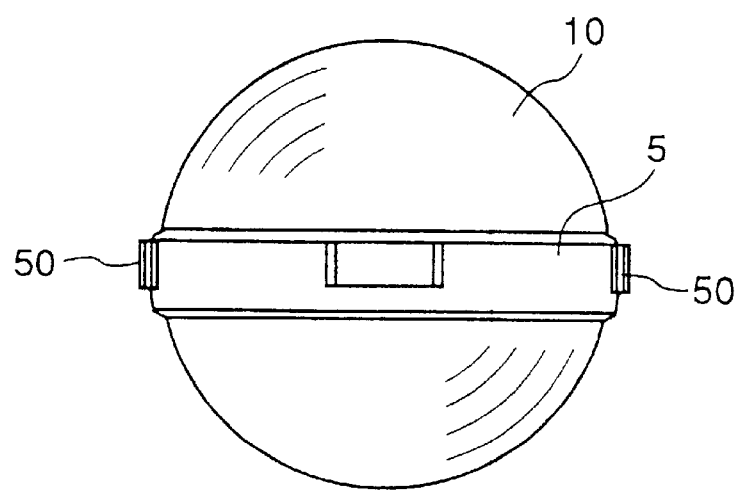
FIG. 3 is a front view showing the condition of a resin liner fixed to a ball portion in the method of manufacturing a spherical bearing in the first embodiment.
Figure 4:
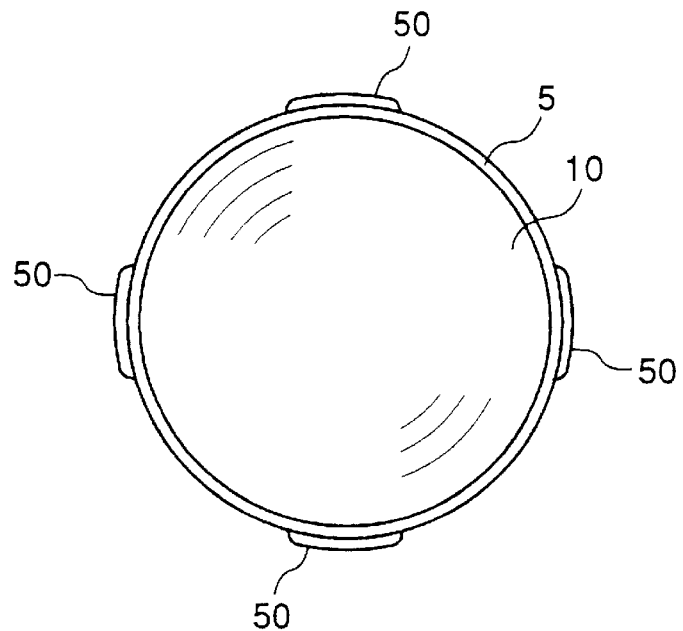
FIG. 4 is a plan view showing the condition of the resin liner fixed to the ball portion in the method of manufacturing the spherical bearing in the first embodiment.

The holder 2 of the spherical bearing in this embodiment is manufactured by die casting with the ball portion 10 of the ball shank 1 inserted as a core in a casting metal mold. Therefore, in order to bury the resin liner 5 in the ball receiving portion 20, it is necessary that such a resin liner 5 be fixed on a steel ball first which is to form the ball portion 10. FIG. 3 and FIG. 4 are a front view and a plan view respectively showing the condition of the resin liner 5 fixed to a steel ball. This resin liner 5 is molded to the shape of a ring having an inner diameter suited to an outer diameter of the ball portion 10, and fixed to the ball portion 10 so as to cover a maximum diameter part thereof. The resin liner 5 is provided on an outer circumferential surface thereof with projections 50 serving as turn stops, which prevent the resin liner 5 from being turned with respect to the ball receiving portion 20 when the resin liner 5 is buried afterward in the ball receiving portion 20 of the holder 2 during a die casting operation. This resin liner 5 is molded to about 0.8 mm in thickness, which is larger than the width of the clearance (not larger than 0.1 mm) between the ball receiving portion 20 and ball portion 10.

Such a resin liner 5 is manufactured by injection molding a synthetic resin with the ball portion 10 inserted as a core in a metal mold. Namely, the injection molding of a synthetic resin is done with a steel ball which is to form the ball portion 10 inserted in a metal mold, the molding of the resin liner 5 and the fixing of the same on the ball portion 10 being thus done in one step. When the molding of the resin liner 5 is done in this manner, an operation for fixing the resin liner to the ball portion 10 is omitted, and an inner circumferential surface of the resin liner 5 becomes substantially in conformity with the spherical surface of the ball portion 10. Moreover, such a resin liner 5 can be fixed closely and reliably on the ball portion 10 with the tightening of the ball portion 10 by the resin liner 5 prevented.

The temperature of the metal mold during this injection molding operation is 170 to 200° C., and that of the phenol resin used for the molding operation around 100° C. A molten resin is injected into a cavity in the metal mold, and thereafter cured to a level at which the shape of the molten resin is retained, the metal mold being opened immediately to take out the resin liner-fixed steel ball therefrom. In order to turn the phenol resin molded to around 0.8 mm in thickness into a macromolecular compound which is not softened even with heat, it is necessary that the resin be held in the metal mold of the above-mentioned temperature for around 10 to 20 seconds even after the injection molding operation is completed. When the resin liner is thus taken out of the metal mold immediately after the completion of the injection molding operation, the property peculiar to a thermosetting resin is not given to such a resin liner.

Figure 5:
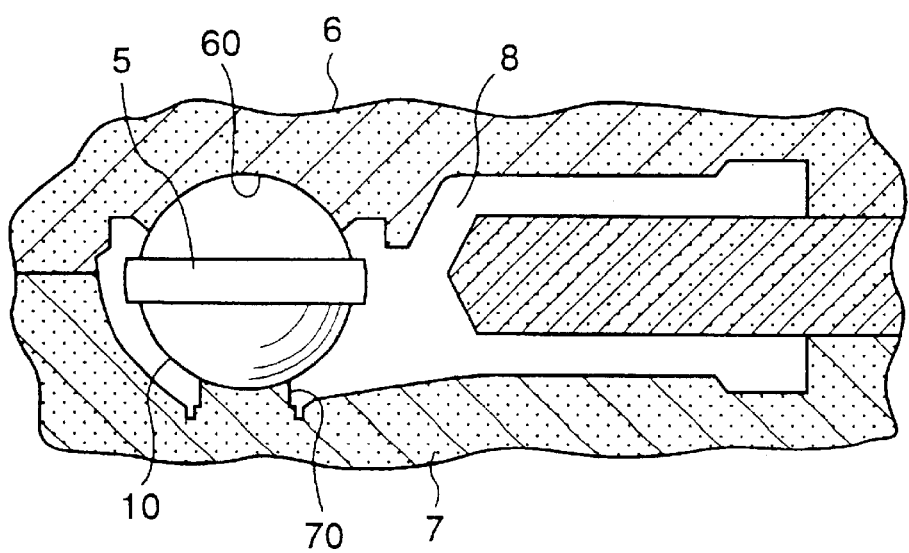
FIG. 5 is a sectional view showing the condition of casting a holder with the ball portion used as a core in the method of manufacturing a spherical bearing in the first embodiment.

The holder is then die cast. In order to carry out the die casting of the holder, the ball portion 10, to which a resin liner was fixed in a preceding step, is inserted as a core in a pair of vertically divided casting molds 6, 7 as shown in FIG. 5. In this condition, a molten metal formed of an aluminum alloy or a zinc alloy is press fitted in the cavity 8 of the metal molds. During this time, the inserted ball portion 10 is held between support seats 60, 70 formed in the metal molds 6, 7, so that the displacement of the ball portion in the metal molds is prevented. The resin liner 5 is positioned in a fixed state with respect to the ball portion 10 in the cavity 8, and covered with the alloy injected into the same cavity 8 with the inner circumferential surface, which is to contact the ball portion 10, of the resin liner left uncovered therewith.

Figure 6:
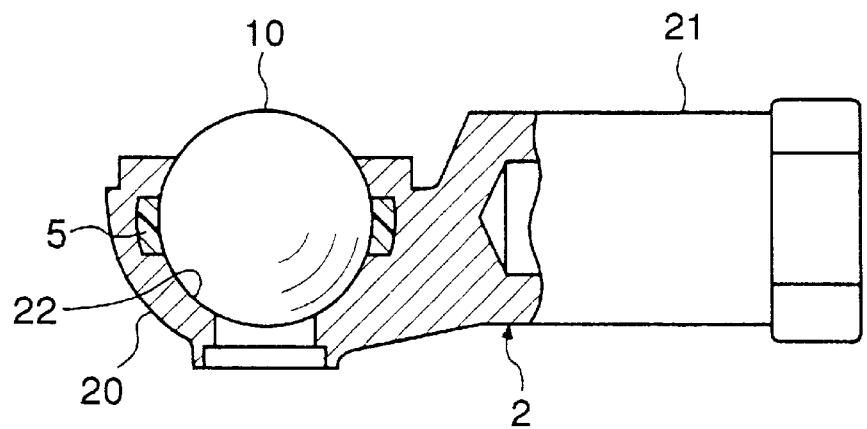
FIG. 6 is a sectional view showing a cast holder in the method of manufacturing a spherical bearing in the first embodiment.

Consequently, the holder 2 with the ball portion 10 wrapped in the above-mentioned alloy is cast as shown in FIG. 6. The ball portion is exposed to view with respect to the ball receiving portion 20 of the holder 2 at the parts only thereof which are opposed to the support seats 60, 70 of the metal molds 6, 7. The resin liner 5 fixed to the ball portion 10 is in a buried state with respect the cast ball receiving portion 20, and fixed firmly in the ball receiving portion 20. When a zinc alloy is used as the material for the holder 2, the casting temperature is not lower than 400° C., and, when an aluminum alloy is used, the casting temperature is not lower than 600° C. Therefore, the resin liner is heated to a temperature near these temperatures, though the heating time is very short, and the resin liner is necessarily held at a temperature around 200° C., which is lower than these temperatures, for as long as around 10-odd seconds.

As a result, the chemical structure of the resin liner changes as follows. Namely, after the injection molding operation, a three-dimensional cross-linking reaction was not promoted, and did not have the property peculiar to a thermosetting resin. However, since the holder is die cast, the heat occurring during the casting operation causes a three-dimensional cross-linking reaction to be promoted, so that the resin liner comes to be provided with the property peculiar to the thermosetting resin after the completion of the die casting operation.

Figure 7:
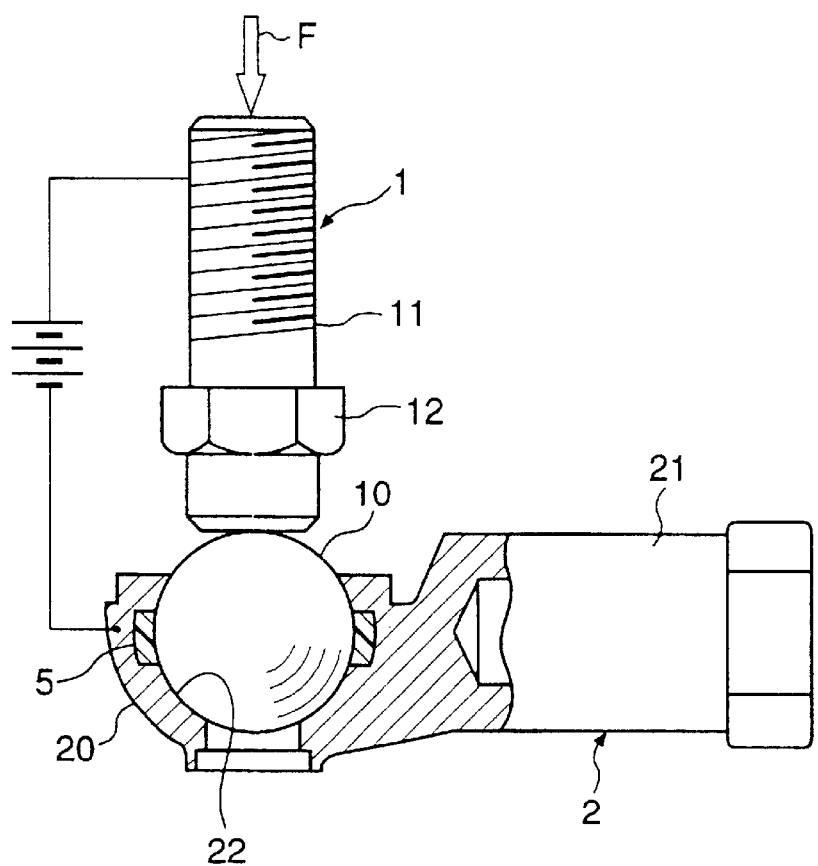
FIG. 7 is a sectional view showing the condition of welding a shank to the ball portion held in the holder in the method of manufacturing a spherical bearing in the first embodiment.

The shank 11 is then welded to the ball portion 10 held in the ball receiving portion 20 of the holder 2. To carry out the welding of these parts, the projection welding is utilized. As shown in FIG. 7, an end surface of the shank 11 is brought into pressure contact at a predetermined level of force F with the spherical surface of the ball portion 10 exposed to view in the ball receiving portion 20 of the holder 2, and electrodes are brought into contact with the holder 2 and shank 11. The welding operation is carried out with a predetermined welding current applied between these electrodes. The ball receiving portion 20 of the holder 2 closely contact the ball portion 10 in the preceding step. Therefore, even when the welding current is thus applied indirectly to the ball portion 10 via the holder 2, the electric resistance in a boundary portion between the ball receiving portion 20 and ball portion 10 is very low, so that the shank 11 can be welded to the ball portion 10 without fusing the ball receiving portion 20 and ball portion 10 together. Since the resin liner 5 covers only a part of the spherical surface of the ball portion 10, the resin liner does not prevent the application of the welding current from the ball receiving portion 20 to the ball portion 10. When the projection welding operation thus finishes, the ball shank 1 with the ball portion held in the ball receiving portion 20 of the holder 2 is completed.

An external force is thereafter exerted on the holder 2 or ball shank 1, and a very narrow clearance is thereby formed between the ball receiving portion 20 and ball portion 10 which are still left closely contacting each other. The methods of exerting such an external force to the holder or ball shank includes, for example, patting the outer circumference of the ball receiving portion 20, patting the ball shank 1 in the axial direction thereof, and giving a light shock to the ball portion 10. Owing to such methods, the ball portion 10 of the ball shank 1 comes into sliding contact with the ball receiving portion 20 of the holder 2 freely, and the ball shank 1 and holder 2 are put in a swingably or rotatably connected state.

Finally, the boot seal 3 is provided between the shank 10 and the outer circumferential edge of the holder 2, and the seal pocket 30 formed by this boot seal 3 is filled with a lubricant, such as grease to complete the spherical bearing in this embodiment.

According to such manufacturing method, it is unnecessary to provide metal mold holding time for giving the property peculiar to a thermosetting resin to the resin liner, i.e., for thermally curing the resin liner after the injection molding thereof finishes. The steel ball on which the resin liner is fixed can be taken out immediately from the metal mold after the injection molding operation finishes. Since the time zone for thermally curing the resin liner coincides with that for casting the holder, it is unnecessary to additionally secure the time for thermally curing the resin liner. Accordingly, the manufacturing time is shortened by a period of time by which the metal mold holding time after the completion of the injection molding operation can be omitted, so that the production efficiency can be improved. Since the number of products per unit time can be increased, the reduction of the manufacturing cost is attained.

Second Embodiment

Figure 8:
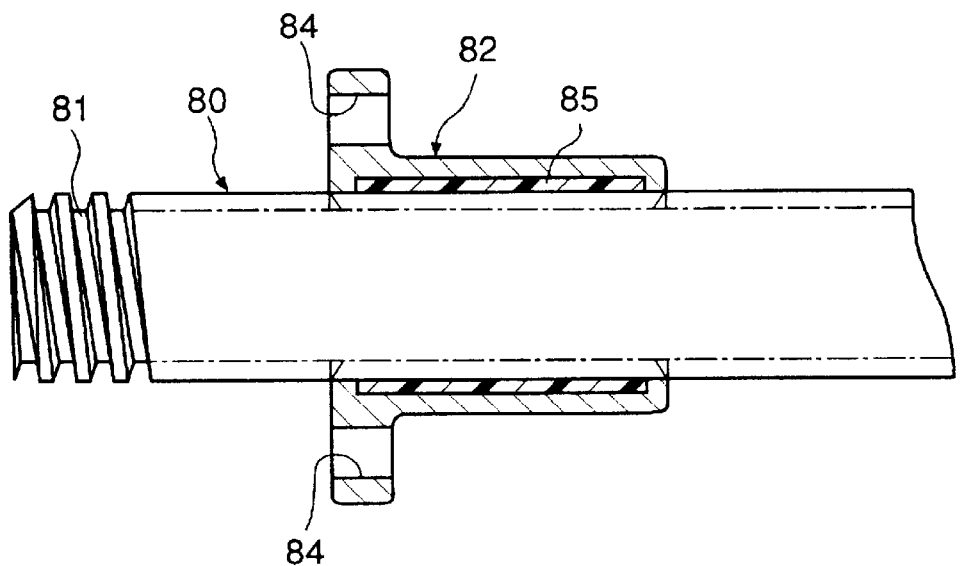
FIG. 8 is a sectional view showing a second embodiment in which the method according to the present invention is applied to a slide screw apparatus.
Figure 9:
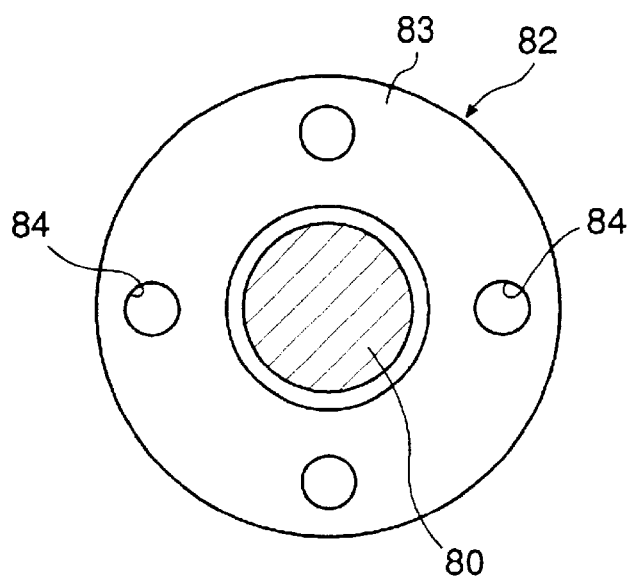
FIG. 9 is a front view showing the slide screw apparatus in the second embodiment.

FIG. 8 and FIG. 9 show a sliding screw apparatus manufactured by utilizing the method according to the present invention. This sliding screw apparatus is formed of a screw shaft (first member) 80 having a helical male thread 81 as a sliding guide surface on an outer circumferential surface thereof, and a slide nut (second member) 82 having in its inner circumferential surface a female thread engaged with the male thread 81 of the screw shaft 80. Since the male thread 81 and female thread 82 slidingly contact each other, the slide nut is moved helically around the screw shaft 80, and the rotational movement of the screw shaft 80 is converted into a linear movement of the slide nut 82.

The male thread 81 of the screw shaft 80 is formed as, for example, a 30-degree trapezoidal thread in an outer circumferential surface of the screw shaft 80 at a predetermined lead angle by rolling, cutting and grinding. A servomotor is connected to one end of the screw shaft 80 via bracket (not shown). When a predetermined quantity of rotation is given to the screw shaft 80, the slide nut 82 can be moved axially in accordance with the quantity of rotation of the screw shaft 80.

On the other hand, the slide nut 82 has a through hole through which the screw shaft 80 is passed, and is formed substantially cylindrically. The slide nut also has a flange 83, to which a movable body (not shown) to be linearly guided is fixed, formed on an outer circumferential surface thereof so as to project therefrom. The flange is provided with bolt setting holes 84 through which fixing bolts are inserted. A cylindrical resin liner 85 is buried in an inner circumferential surface of this slide nut 82, and this resin liner 85 is provided in its inner circumferential surface with a female thread which slidingly contacts the male thread 81 of the screw shaft 80. In order to make a movement of the slide nut 82 smoothly with respect to the screw shaft 80 and prevent the resin liner 85 from being softened due to the frictional heat, a thermosetting resin of a low friction coefficient is used for this resin liner. From the viewpoint of the lessening of the lubrication between the screw shaft 80 and slide nut 82, a resin having a self-lubricating ability is preferably used.

The sliding screw apparatus thus constructed is manufactured in the following manner.

First, the male thread 81 is formed by rolling with respect to the outer circumferential surface of the screw shaft 80. According to the rolling process, the surface of the male thread 81 is work hardened, so that the screw shaft 80 of a high abrasion resistance can be obtained.

Figure 10:
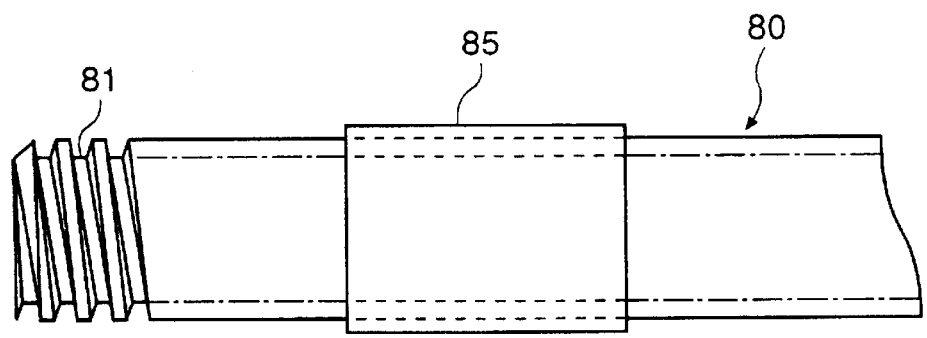
FIG. 10 is a front view showing the condition of a resin liner fixed to a screw shaft in a method of manufacturing the slide screw apparatus in the second embodiment.

Next, the cylindrical resin liner 85 is injection molded on the outer circumferential surface of such a screw shaft 80 with the screw shaft 80 on which the male thread 81 is formed used as a core. FIG. 10 shows the condition of the cylindrical resin liner 85 thus injection molded and fitted around the outer circumferential surface of the screw shaft 80. When the molding of the resin liner 85 is done in this manner, the female thread closely engaged with the male thread 81 of the screw shaft 80 is formed in the inner circumferential surface of the resin liner 85, so that the clearance between the resin liner 85 and screw shaft 80 can be eliminated completely.

When the phenol resin is used for the resin liner, the temperature of the metal mold during the injection operation is 170 to 200° C., and the temperature of the resin during the same operation is around 100° C. When the molten resin is cured after the molten resin is injected into the cavity in the interior of the metal mold, to a degree at which the shape of the molten resin is maintained, the metal molds are immediately opened, and the screw shaft 80 around which the resin liner 85 is fitted is taken out of the metal mold. In this case, sufficient retention time to thermally cure the resin liner 85 is not given thereto, so that the property peculiar to a thermosetting resin is not yet given to such a resin liner 85.

Figure 11:
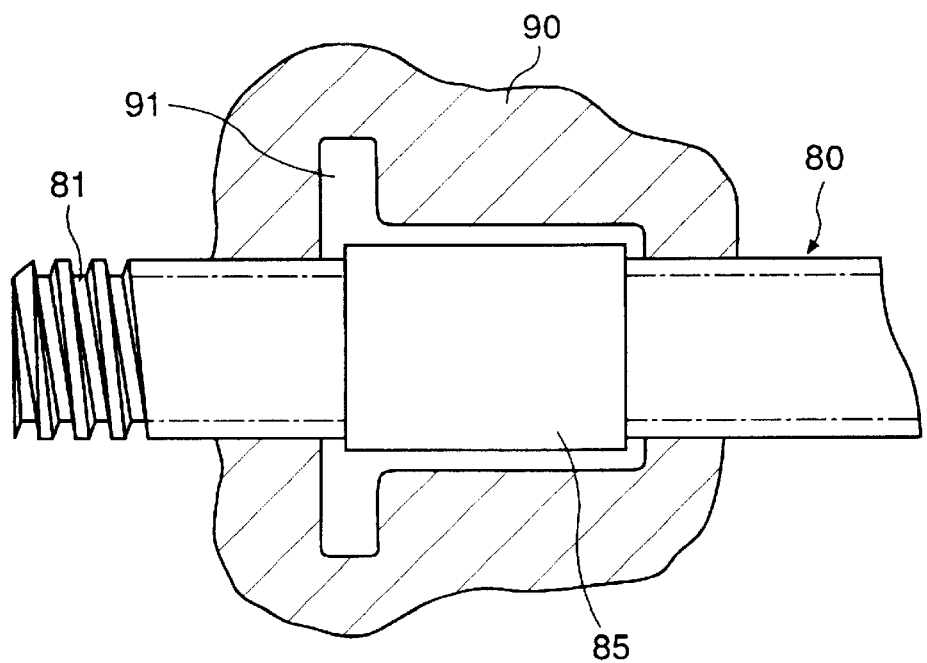
FIG. 11 is a sectional view showing the condition of casting a slide nut with the screw shaft used as a core in the method of manufacturing the slide screw apparatus in the second embodiment.

Next, the slide nut 82 is die cast. In order to carry out this die casting operation, the screw shaft 80 around which the resin liner 85 is fitted in a preceding step is inserted as a core in a casting metal mold 90 as shown in FIG. 11, and a molten aluminum alloy or a molten zinc alloy is press-fitted with the core left as it is in a cavity 91 in the metal mold. During this time, the resin liner 85 fitted around the screw shaft 80 is positioned in the cavity 91, and necessarily covered with an alloy injected into the cavity 91 with the portion of the inner circumferential surface of the resin liner which contacts the screw shaft 80 left uncovered therewith.

As a result, the substantially cylindrical slide nut 82 through which the screw shaft 80 is passed is cast. The resin liner 85 is put in a buried state with respect to the inner circumferential surface of such a slide nut 82, and such a resin liner 85 is fixed firmly to the inner circumferential surface of the slide nut 82. While the die casting operation is carried out, the temperature of the molten alloy press-fitted in the cavity of the metal mold 90 is high as mentioned above. Therefore, the temperature of the resin liner is also necessarily maintained at around 200° C. both during the casting operation and for some time after the casting operation finishes, and, in consequence, the thermal curing of the resin liner progresses.

Finally, an external force is exerted lightly on the slide nut 82 or screw shaft 80 to form a very narrow clearance between the male thread 81 of the screw shaft 80 and the female of the resin liner 85, which are still left closely contacting each other. This enables the male thread 81 and female thread to slidingly contact each other freely, and the slide nut 82 to be rotated around the screw shaft 80 freely.

According to the method of manufacturing such a sliding screw apparatus, it is unnecessary just as in the manufacturing of the above-mentioned example of the spherical bearing that the metal mold holding time for thermally curing the resin liner 85 after the injection molding thereof be provided so as to give the property peculiar to a thermosetting resin to the resin liner 85. Therefore, the screw shaft 80 around which the resin liner 85 is fitted firmly can be immediately taken out of the metal mold after the injection molding operation finishes. Since the time for thermally curing the resin liner 85 coincides with that for casting the slide nut 82, it is unnecessary to additionally secure the time for thermally curing the resin liner 85. Accordingly, the apparatus manufacturing time is shortened by a period of time corresponding to that by which the time for holding the metal mold after the completion of the injection molding operation can be omitted. Moreover, the production efficiency can be improved, and the manufacturing cost can be reduced.

In the above-described methods of manufacturing spherical bearings and sliding screw apparatuses, a holder as a second member of the present invention and a slide nut are molded by die casting. Besides the die casting, a molding method, such as metal injection molding (MIM) and the like can be suitably selected as long as the method exerts a certain level of high-temperature heat on a resin liner in a second member molding step.

According to the method of manufacturing sliding bearings of the present invention described above, the thermal curing of the resin liner constituting the sliding guide surface is done simultaneously with the metal molding operation for the second member, i.e., the metal molding of the second member and the thermal curing of the resin liner are carried out concurrently in the same time zone. Therefore, even when such a resin liner is manufactured by injection molding a thermosetting resin, the production time can be reduced, and in its turn the reduction of the production cost can be attained.

What is claimed is:

1. A method of manufacturing sliding bearings, having:
a first member provided with a sliding guide surface,
a second member provided with a sliding guide surface slidingly contacting the sliding guide surface of the first member and freely movable relatively to the first member, and
a resin liner provided on at least a part of the sliding guide surface of the second member and slidingly contacting the sliding guide surface of the first member,
wherein the method comprises:
a first step of forming the sliding guide surface on the first member,
a second step of fixing a thermosetting resin which constitutes the resin liner on the whole or a part of the sliding guide surface of the first member by an injection molding operation with the first member inserted as a core in a metal mold,
a third step of molding the second member, which covers the sliding guide surface of the first member, by a metal molding operation with the resin liner-fixed first member placed firmly as a core in a metal mold, and thermally curing at the same time the resin liner with the heat working on the sliding guide surface of the first member during the molding of the second member, and
a fourth step of forming a clearance between the sliding guide surfaces of the first member and second member by exerting an external force on the first member or the second member, and thereby enabling a relative movement of the second member with respect to the first member to be made.

2. A method of manufacturing sliding bearings according to claim 1, wherein the first member is a ball shank provided with a convex sliding guide surface, the second member being a holder provided with a concave sliding guide surface, wherein the first member and second member are rotatably or swingably connected together.

3. A method of manufacturing sliding bearings according to claim 1, wherein in the second step, the thermosetting resin is in a non-macromolecular state and, in the third step, the thermosetting resin changes from the non-macromolecular state to a macromolecular state.

4. A method of manufacturing sliding bearings according to claim 1, wherein in the third step, a three-dimensional cross-linking reaction occurs in the thermosetting resin.

5. A method of manufacturing sliding bearings according to claim 1, wherein in the second step, the thermosetting resin is partially thermally cured after the injection molding operation and, in the third step, the thermosetting resin is completely thermally cured during the molding of the second member.

6. A method of manufacturing sliding bearings according to claim 5, wherein in the second step, molten thermosetting resin is thermally cured to a level at which the shape of the thermosetting molten resin is retained.

7. A method of manufacturing sliding bearings according to claim 1, wherein the resin liner is formed by a phenol resin, and the molding temperature of the second member is at least 400° C.

* * * * *

UNITED STATES PATENT AND TRADEMARK OFFICE
CERTIFICATE OF CORRECTION

PATENT NO. : 6,715,207 B2
DATED : April 6, 2004
INVENTOR(S) : Hidekazu Michioka

It is certified that error appears in the above-identified patent and that said Letters Patent is hereby corrected as shown below:

<u>Column 10,</u>
Line 18, "inserted as a core in a metal mold," should read -- inserted as a core in a metal mold, in a manner such that after the injection molding operation, a three-dimensional cross-linking reaction is not promoted, and does not have the property peculiar to a thermosetting resin, --.
Line 26, "second member, and" should read -- second member in a manner such that three-dimensional cross-linking occurs and now has a property peculiar to a thermosetting resin, and --

Signed and Sealed this

Twenty-ninth Day of June, 2004

JON W. DUDAS
*Acting Director of the United States Patent and Trademark Office*